United States Patent Office 3,598,529
Patented Aug. 10, 1971

3,598,529
PROCESS FOR CONVERTING HYDROGEN SULFIDE AND SULFUR DIOXIDE TO ELEMENTAL SULFUR
André Deschamps, Chatou, and Philippe Renault, Neuilly-sur-Seine, France, assignors to Institut Francais du Petrole des Carburants et Lubrifiants, Rueil-Malmaison, Hauts-de-Seine, France
No Drawing. Filed Feb. 19, 1969, Ser. No. 800,761
Claims priority, application France, Feb. 29, 1968, 141,894
Int. Cl. C01b 17/04
U.S. Cl. 23—225R
28 Claims

ABSTRACT OF THE DISCLOSURE

Hydrogen sulfide is reacted with sulfur dioxide to form elemental sulfur in the persence of a solvent containing an alkali or alkaline earth metal salt and at least one member from the group consisting of organic monocarboxylic acids, polycarboxylic acids or partial esters thereof.

---

This invention relates to the known process for converting hydrogen sulfide and sulfur dioxide to sulfur consists of reacting these compounds in a solvent according to the reaction:

$$2H_2S + SO_2 \rightarrow 3S + 2H_2O \tag{1}$$

For example, according to the French Pat. No. 1,492,-013, this reaction is carried out in a liquid ester of phosphoric acid. This process is satisfactory at moderate temperatures, for example lower than 60° C. with gases containing relatively high amounts of $SO_2$ and $H_2S$, for example a gaseous mixture containing more than 40% by volume of these compounds.

When the content of $SO_2$ and $H_2S$ is low, for example lower than 5%, and the temperature is high, for example higher than the melting point of sulfur (about 115° C.), the conversion rate decreases, as well as when other solvents are used, for example glycols or glycol ethers.

In the French patent application No. 125,361 filed on Oct. 20, 1967, new compounds are described which are able to catalyze the conversion of $H_2S$ to sulfur under the deleterious conditions of concentrations and temperatures hereabove stated. These compounds are hydrocarbyl phosphates of alkali or alkali-earth metals. An object of this invention is to provide a new class of compounds which are able to catalyze the conversion of $H_2S$ to sulfur, in various solvents such as alcohols, glycols, glycols ethers, glycols polyethers, and more generally polyalkyleneglycols and mixtures thereof. These compounds are remarkably stable even at temperatures higher than the melting point of sulfur. Thus this process may be carried out within a broad temperature range, for example between 20 and 160° C., the highest advantages being obtained at the higher temperatures at which, as shown before, the conventional processes are unsatisfactory.

These compounds are able to catalyze the reaction (1) as well in liquid phase as in solid phase, for example when they are supported on such solid carriers as alumina, silica, kaolin, kieselguhr, carbon or mixtures thereof.

The catalysts of this invention are alkali and alkali-earth metals salts of carboxylic acids, i.e. salts of the metals of groups I and II, left column, of the periodic chart of elements. More particularly these acids may be the following:

(1) The linear or branched acyclic carboxylic mono- or polyacids either saturated or not, having 2 to 30 carbon atoms per molecule, preferably 2 to 20 and more preferably 4 to 10, these acids being optionally substituted with such radicals as alkyl, cycloalkyl, aryl, alkenyl, alkyloxy, aryloxy, preferably having 1 to 10 carbon atoms, the main chain or the substituents optionally containing one or more groups such as alcohol, thiol, ether, aldehyde, amine and ketone, one or several hydrogen atoms being optionally substituted with a halogen atom such as chlorine or bromine, or a nitro group.

With respect to polyacids, mono- or polyesters thereof may be used provided there remains at least one carboxylic acid group which may be formed into a salt with an alkali or alkali earth metal hydroxide.

(2) The alicyclic carboxylic mono- or polyacids, either saturated or not, having 4 to 30 carbon atoms, preferably 5 to 10, these acids being optionally substituted with radicals, particularly alkyl, cycloalkyl, aryl, alkenyl, alkyloxy, aryloxy radicals preferably having 1 to 10 carbon atoms, the main ring as well as the substituents optionally containing one or more groups such as alcohol, thiol, ether, aldehyde, amine and ketone, one or more hydrogen atoms being optionally substituted with halogen atoms for example chlorine or bromine, or with nitro groups.

These compounds are those wherein the carboxylic groups are directly linked with nonaromatic rings.

The mono and polyesters of these acids may also be used, provided they conform to the conditions given herebefore with respect to the first class of acids.

(3) The aromatic carboxylic mono- or polyacids having 7 to 40 and preferably 7 to 12 carbon atoms, these acids having one or more rings, either condensed or not, these rings being optionally substituted with such radicals as alkyl, cycloalkyl, aryl, alkenyl, alkyloxy or aryloxy preferably having 1 to 10 carbon atoms, the main aromatic ring or the substitutents optionally containing one or more groups such as alcohol, thiol, ether, aldehyde, ketone, amine, at least one of the hydrogen atoms being optionally substituted with a nitro group or a halogen atom such as, for example, chlorine or bromine.

The mono and polyesters may also be used provided they conform to the hereabove-given conditions.

(4) The heterocyclic acids containing 4 to 30 and preferably 4 to 10 carbon atoms and a total of 1 to 15 and preferably 1 to 5 heteroatoms, either substituted or not with such radicals as alkyl, cycloalkyl, aryl, alkenyl, alkyloxy or aryloxy preferably having 1 to 10 carbon atoms, the heterocyclic rings or substituents optionally containing one or more groups sucsh as alcohol, thiol, ether, aldehyde, amine, ketone, one or more hydrogen atoms being optionally substituted with nitro groups or halogen atoms, for example chlorine or bromine.

The heteroatoms are preferably oxygen, sulfur and/or nitrogen.

In this type of compounds, the carboxylic groups are directly linked to at least one of the heterocycles. These acids distinguish over those of the other classes since they contain at least one heteroatom in their ring as well as carbon atoms. On the contrary the total number of heteroatoms refers to all heteroatoms, such as oxygen, sulfur, nitrogen and halogen atoms of the molecule. As a rule these acids contain 1 to 5, preferably 1 to 3 heteroatoms (oxygen, sulfur or nitrogen) in the rings.

The following salts may be used, by way of example:

(1) From the first group, the sodium and potassium salts of the following acids:

acetic, propionic, isobutyric, valeric, caprioic, 2-chlorobutanoic, 3-phenylpentanoic, cyclohexylacetic.
malonic, isopropylmalonic, succinic, glutaric, α,α-dimethyl glutaric, adipic, sebacic, tetradecane-dioic.
1,1,2-ethane tricarboxylic, 2,2,6,6-heptane tetracarboxylic.
acrylic, isocrotonic, 4-pentenoic, 4-hexenoic, trimethylacrylic, 3-pentynoic, (2,2-dimethyl-propyl) propiolic, allene carboxylic, 5-hexene-3-ynoic, cis and trans cinnamic.

maleic, glutaconic.

monoethyl malonate, monomethyl succinate.

glucolic, acetoxyacetic, lactic, $\alpha$-hydroxy-$\alpha,\beta$-dimethylbutyric, tartric, tartronic, citric.

(2) From the second group, the sodium and potassium salts of the following acids may be mentioned:

cyclobutane carboxylic, cyclopentane carboxylic;

1,3-cyclohexane dicarboxylic, 4-chloro cyclohexane carboxylic, 3-methyl cyclopentylidene-1,1-diacetic, 2,2,6-trimethyl cyclohexane carboxylic, decahydronaphthalene carboxylic, 3-vinylcyclohexane carboxylic, 2-phenyl cyclohexane carboxylic;

cyclobutene carboxylic, cyclopentene carboxylic, cyclohexene carboxylic, 1-cyclohexene-1,4-dicarboxylic, 3,5-cyclohexadiene carboxylic;

2-hydroxy cyclohexane carboxylic, bicyclo (2,2,2) octane-1-carboxylic.

(3) From the third family, the sodium and potassium salts of the following acids may be mentioned:

benzoic, ortho-methyl benzoic, ortho-isopropyl benzoic, para ethyl benzoic, ortho phenyl benzoic, ortho hydroxymethyl benzoic, meta-hydroxy benzoic, meta-methoxy benzoic, ortho-phenoxy benzoic, para-acetyl benzoic, ortho-benzoyl benzoic;

ortho-chloro benzoic, para-nitro benzoic, para chloro benzoic, ortho-amino benzoic, salicylic, para-amino salicylic;

2,6-dimethyl benzoic, 2,4,6-trimethyl-3-ethyl benzoic, 3-methyl-4-hydroxy benzoic, 2-methyl-3-vinyl benzoic, para-tert-butyl benzoic;

ortho phthalic, isophthalic, terephthalic, trimesic, mellitic, naphthoic, 2-methyl naphthoic, 3-hydroxy naphthoic, meta-hydroxymethyl naphthoic, para-formyl naphthoic.

(4) From the fourth group, the sodium and potassium salts of the following acids are given by way of examples:

2-furan carboxylic, 2-tetrahydrofuran carboxylic, 2-thiophene carboxylic, 2-tetrahydrothiophene carboxylic, 4-pyran carboxylic, 3-pyrrole carboxylic, 3-pyridine carboxylic, 3-pyrazine carboxylic, 5-methyl-2-pyridine carboxylic, 5-acetyl-3-pyridine carboxylic, 2-methyl-3-ethyl-4-pyridine carboxylic, 4-quinoline carboxylic, 5-methyl-4-quinoline carboxylic.

Among the preferred salts, the following are to be mentioned:

potassium citrate, potassium adipate, sodium cyclohexane carboxylate, sodium benzoate, potassium benzoate, potassium hydrogen terephthalate, potassium salicylate;

more preferably:

potassium benzoate, potassium salicylate, sodium nicotinate, potassium nicotinate, sodium cinnamate, potassium furoate.

If the catalysts remain active in a broad range of concentrations, there will be preferably used from 1 to 50 g. of catalyst per liter of solvent.

Many solvents may be used, for example tetramethylene sulfone, the triesters of ortho-phosphoric acid, heavy alcohols having for example 12 to 20 carbon atoms, esters, and, as a rule, all liquids which are inert with respect to $H_2S$ and/or $SO_2$.

The preferred solvents are of the following types:

alkylene glycols, ethers and esters of alkylene glycols, polyalkylene glycols, ethers and esters thereof, more particularly ethylene glycol, ethers and esters of ethylene glycol, polyethylene glycols, ethers and esters of polyethylene glycols.

By way of examples:

ethylene glycol, triethylene glycol, heptaethylene glycol, di-1,3-propylene glycol, penta-1,3-propylene glycol, decaethyleneglycol monoethyl ether, tetra-1,4-butylene glycol, polyethylene glycol having a molecular weight of about 400, monoacetate of hexaethylene glycol monopropyl ether, monobutyrate of hexaethylene glycol monopropyl ether.

This process may be applied to all gases containing $H_2S$ and/or $SO_2$, irrespective of the contents thereof, for example to gases containing at least 0.1% by volume of each of $H_2S$ and $SO_2$, the total amount thereof being preferably not higher than 40% by volume. Beyond this value the process also works but its advantages as compared to the known processes are not so important. The process may be applied, in particular, to gases from Claus ovens which contain about 1% $H_2S$ and 0.5% $SO_2$ at a temperature of about 120 to 140° C. Heavy solvents may be used such as polyethylene glycols and ethers thereof, so as to reduce the losses of solvent. The obtained sulfur may be easily recovered by conventional means.

This process may also be applied:

for purifying natural, refinery or synthesis gases containing low amounts of $H_2S$: $SO_2$ is added thereto in order to carry out the reaction.

for purifying a $SO_2$-containing gas, for example fumes: $H_2S$ is then added.

To practice the invention, several embodiments may be used.

For example, according to a preferred embodiment, the contact between the $H_2S$ and $SO_2$-containing gases and the solvent containing the catalyst may be carried out in a tower containing the liquid phase through which the gas is injected.

The liquid phase containing the catalyst may also flow throughout a column containing plates or packing, in counter-current contact with the ascending gases.

The pressure may be chosen between 0.1 and 20 kg./cm.$^2$, these values being not limitative.

The following Examples 1 to 8 and 10 to 19 are given for illustrative purposes only.

EXAMPLE 1

There is used a tower of 4 cm. diameter, containing perforated plates.

There is admitted at the bottom, under atmospheric pressure, a gas at a rate of 500 liters per hour, said gas having the following composition by volume:

| | Percent |
|---|---|
| $SO_2$ | 0.5 |
| $H_2S$ | 1 |
| $H_2O$ | 25 |
| $CO_2$ | 16 |
| $N_2$ | 57.5 |

300 cc. of polyethyleneglycol of molecular weight 400, containing 2 g. of potassium benzoate, are initially introduced in the tower and maintained at 130° C. The gas issuing from the tower contains only 0.3% of $H_2S$ and $SO_2$, the purification yield being 80%.

The purification yield is defined as follows:

$$R\% = \frac{(\text{mols of } H_2S + SO_2) \text{ at the inlet} - (\text{mols of } H_2S + SO_2) \text{ at the outlet}}{(\text{mols of } H_2S + SO_2) \text{ at the inlet}} \times 100$$

EXAMPLE 2

Example 1 is repeated with 2 g. of potassium salicylate instead of potassium benzoate.

Other conditions remaining unchanged, the purification yield is 75%.

EXAMPLE 3

Example 1 is repeated with 2 g. of potassium hydrogen phthalate instead of potassium benzoate. The yield is 68%.

EXAMPLE 4

Example 1 is repeated with 300 cc. of hexaethylene glycol containing 3 g. of sodium benzoate instead of the solvent used therein. The yield is 73%.

EXAMPLE 5

Example 1 is repeated with 300 cc. of octaethylene glycol monoethyl ether containing 1.5 g. of potassium glycolate at 120° C. The yield is 66%.

EXAMPLE 6

Example 1 is repeated with 300 cc. of tetrapropylene glycol containing 2 g. of potassium adipate. The yield is 65%.

EXAMPLE 7

Example 1 is repeated with 300 cc. of decaethylene glycol monomethyl ether containing 6 g. of potassium cyclohexane carboxylate.

The yield is 67%.

EXAMPLE 8

Example 1 is repeated except that the gas has the following composition:

|  | Percent |
|---|---|
| $SO_2$ | 8 |
| $H_2S$ | 16 |
| $N_2$ | 76 |

The purification rate is 98%.

By way of comparison, without potassium benzoate, the yield is only 40%.

EXAMPLE 9

By way of comparison, if Example 1 is repeated without catalyst, the yield is only 10%.

EXAMPLE 10

Example 1 is repeated with a gaseous mixture containing only $H_2S$ and $SO_2$ in a volumetric ratio of 2/1. The purification yield is practically 100%.

EXAMPLES 11 TO 19

Example 1 is repeated except that other catalysts have been used. The catalyst and the purification yield are given hereafter. In Example 19, the solvent has been changed.

| Example No. | Catalyst | Purification yield, percent |
|---|---|---|
| 11 | Potassium para-amino benzoate | 73 |
| 12 | Potassium para-amino salicylate | 76 |
| 13 | Sodium cinnamate | 82 |
| 14 | Sodium para-chloro benzoate | 81 |
| 15 | Potassium furoate | 83 |
| 16 | Potassium nicotinate | 91 |
| 17 | Potassium mono-ethyl malonate | 69 |
| 18 | Calcium nicotinate | 78 |
| 19 | Potassium nicotinate in 300 cc. of tributyl phosphate | 89 |

What is claimed as this invention is:

1. A process for manufacturing elementary sulfur by reacting hydrogen sulfide with sulfur dioxide wherein the reaction is carried out in the presence of a solvent inert to $H_2S$ and/or $SO_2$ containing at least one salt of a metal of the left columns of Groups I and II of the periodic chart of elements with a member selected from the group consisting of an organic monocarboxylic acid, an organic polycarboxylic acid, a partial ester thereof, and mixtures thereof.

2. A process according to claim 1, wherein the organic acid of the salt is an acyclic carboxylic mono- or poly-acid having 2 to 30 carbon atoms.

3. A process according to claim 2, wherein the organic acid contains at least one alkyl, cycloalkyl, aryl, alkenyl, alkyloxy, or aryloxy substituent having 1 to 10 carbon atoms, each carboxylic group being directly linked to a hydrocarbon open chain.

4. A process according to claim 1, wherein the organic acid of the salt is an alicyclic carboxylic mono- or poly-acid having 4 to 30 carbon atoms.

5. A process according to claim 4, wherein the organic acid contains at least one alkyl, cycloalkyl, aryl, alkenyl, alkyloxy or aryloxy substituent having 1 to 10 carbon atoms, each carboxylic group being directly linked to at least one non-aromatic ring.

6. A process according to claim 1, wherein the organic acid of the salt is an aromatic, mono- or poly-nuclear carboxylic mono- or poly-acid, having 7 to 40 carbon atoms.

7. A process according to claim 6, wherein the organic acid contains at least one alkyl, cycloalkyl, aryl, alkenyl, alkyloxy or aryloxy substituent having 1 to 10 carbon atoms each carboxylic group being directly linked to at least one aromatic ring.

8. A process according to claim 1, wherein the acid of the salt is a mono- or poly-heterocyclic acid having 4 to 30 carbon atoms with 1 to 5 hetero-atoms selected from the group consisting of oxygen, sulfur and nitrogen in the heterocyclic rings.

9. A process according to claim 8, wherein the acid contains at least one alkyl, cycloalkyl, aryl, alkenyl, alkyloxy or aryloxy substituent having 1 to 10 carbon atoms, each carboxylic group being directly linked to at least one heterocyclic ring.

10. A process according to claim 2 wherein the acid contains 4 to 10 carbon atoms.

11. A process according to claim 4, wherein the acid contains 5 to 10 carbon atoms.

12. A process according to claim 6, wherein the acid contains 7 to 12 carbon atoms.

13. A process according to claim 8, wherein the acid contains 4 to 10 carbon atoms and contains, in the heterocyclic ring 1 to 3 heteroatoms selected from sulfur, oxygen and nitrogen.

14. A process according to claim 1 wherein the acid contains at least one alcohol, thiol, ether, aldehyde, amine or ketone group.

15. A process according to claim 1 wherein the acid contains at least one halogen atom.

16. A process according to claim 1 wherein the acid contains at least one nitro group.

17. A process according to claim 1 wherein the salt is used as a solution in a solvent.

18. A process according to claim 17, wherein the solvent is an alkylene glycol, a polyalkylene glycol, an alkylene glycol ether, a polyalkylene glycol ether, an alkylene glycol ester, a polyalkylene glycol ester, an alkylene glycol ether-ester or a polyalkylene glycol ether-ester.

19. A process according to claim 17 wherein the solvent is a phosphoric acid triester.

20. A process according to claim 17 wherein the solvent is an alcohol of 12 to 20 carbon atoms, an ester or ether of the same, or tetramethylene sulfone.

21. A process according to claim 1 wherein the reaction temperature is between 20 and 160° C.

22. A process according to claim 1 wherein hydrogen sulfide and sulfur dioxide are used in the form of an effluent of a Claus oven, containing about 1% $H_2S$ and 0.5% $SO_2$ by volume at about 120–140° C.

23. A process according to claim 1 wherein hydrogen sulfide and sulfur dioxide each represents 0.1 to 40% by volume, and together represent at most 40% by volume of the treated gas.

24. A process according to claim 1 wherein said metal is an alkali metal or calcium.

25. A process according to claim 1 wherein said salt is selected from the group consisting of potassium benzoate, potassium salicylate, sodium nicotinate, potassium nicotinate, sodium cinnamate, potassium furoate.

26. A process according to claim 18 wherein hydrogen sulfide and sulfur dioxide are used in the form of an effluent of a Claus oven, containing about 1% $H_2S$ and 0.5% $SO_2$ by volume at about 120–140° C.

27. A process according to claim 26, wherein said salt is potassium nicotinate and said solvent is polyethylene glycol having a molecular weight of about 400.

28. A process as defined by claim 17, wherein said solvent is an inert organic solvent.

References Cited
UNITED STATES PATENTS

| | | | |
|---|---|---|---|
| 2,911,438 | 11/1959 | Von Szombathy | 23—225X |
| 3,023,088 | 2/1962 | Urban et al. | 23—226 |
| 3,099,535 | 7/1963 | Maezawa et al. | 23—225 |
| 3,284,162 | 11/1966 | Deal, Jr. et al. | 23—225X |
| 3,397,963 | 8/1968 | Wagner | 23—226 |
| 3,441,379 | 4/1969 | Renault | 23—226 |
| 3,459,495 | 8/1969 | Iida et al. | 23—225X |

OSCAR R. VERTIZ, Primary Examiner

G. O. PETERS, Assistant Examiner